(12) United States Patent
Tehrani et al.

(10) Patent No.: US 8,018,347 B2
(45) Date of Patent: Sep. 13, 2011

(54) DEVICE FOR INTEGRATING AND INDICATING A PARAMETER OVER TIME

(75) Inventors: Payman Tehrani, Norrköping (SE); Mats Robertsson, Stockholm (SE); David Nilsson, Vikingstad (SE); Oscar Larsson, Norrköping (SE); Nathaniel D. Robinson, Kolmården (SE); Rune Groppfeldt, Linköping (SE)

(73) Assignee: Acreo AB, Kista (SE)

( * ) Notice: Subject to any disclaimer, the term of this patent is extended or adjusted under 35 U.S.C. 154(b) by 311 days.

(21) Appl. No.: 12/453,254

(22) Filed: May 5, 2009

(65) Prior Publication Data
US 2009/0303041 A1 Dec. 10, 2009

Related U.S. Application Data

(60) Provisional application No. 61/071,540, filed on May 5, 2008.

(30) Foreign Application Priority Data

May 5, 2008 (EP) .................................... 08155652

(51) Int. Cl.
*G08B 17/00* (2006.01)
*G09G 3/28* (2006.01)
(52) U.S. Cl. ............................ 340/588; 340/620; 345/60
(58) Field of Classification Search .................. 340/588, 340/589, 590, 591, 592, 594, 602, 620, 622; 345/60, 62, 68; 324/664; 600/547
See application file for complete search history.

(56) References Cited

U.S. PATENT DOCUMENTS

| 3,768,976 | A |   | 10/1973 | Hu et al. |  |
|---|---|---|---|---|---|
| 4,966,158 | A | * | 10/1990 | Honma et al. | 600/547 |
| 5,930,023 | A |   | 7/1999 | Mitchell, Jr. et al. |  |
| 7,542,014 | B2 | * | 6/2009 | Kim | 345/60 |
| 2003/0099157 | A1 |   | 5/2003 | Quine |  |
| 2005/0122284 | A1 | * | 6/2005 | Gates et al. | 345/60 |

FOREIGN PATENT DOCUMENTS

| EP | 1 720 188 | 11/2006 |
| EP | 1 862 786 | 12/2007 |
| GB | 2 324 611 | 10/1998 |
| WO | WO 02/071505 | 9/2002 |

OTHER PUBLICATIONS

An EP Search Report dated Sep. 17, 2008.

* cited by examiner

*Primary Examiner* — Van T. Trieu
(74) *Attorney, Agent, or Firm* — Harness, Dickey & Pierce, P.L.C.

(57) ABSTRACT

A device for integrating and indicating a parameter over, comprising: a first electrode (2), a second electrode (3), an electrolyte (5), which is in contact with the first electrode and in consuming contact with a consumption portion (6) of the second electrode, at least two indicators (I1, I2, I3), which are connected to the consumption portion (6) at a respective connecting point (P1, P2, P3). The electrolyte (5) and the consumption portion (6) are selected such that when a voltage is applied over the electrodes (2, 3), the consumption portion (6) is consumed at a predetermined rate, wherein the indicators (I1, I2, I3) are arranged to switch states in response to a consumption frontier (F1, F2) of the consumption portion reaching or passing a connecting point (P1, P2, P3) associated with the respective indicator (I1, I2, I3), wherein at least one of the indicators is a binary (on/off) indicator.

18 Claims, 5 Drawing Sheets

DEVICE FOR INTEGRATING AND INDICATING A PARAMETER OVER TIME

CROSS-REFERENCE TO RELATED APPLICATIONS

This application claims the benefit under 35 U.S.C. §§120/121 of U.S. Provisional Application No. 61/071,540, filed on May 5, 2008, and also claims the benefit under 35 U.S.C. §119 of European Application No. 08155652.4, filed on May 5, 2008. The disclosures of each of the above applications are incorporated herein by reference.

TECHNICAL FIELD

The present disclosure relates to a time-parameter integrating and indicating device, which may be used as an intelligent price tag for groceries that may deteriorate as a function of time and any suitable parameter.

BACKGROUND

In grocery retail stores, it is common that products that may be expected to be of lower quality, e.g. products approaching their "best before" date, are offered to consumers at a discounted price. Hence, since standardized machine readable patterns (e.g. barcodes) are assigned to each product and not to each individual good, it is not possible to merely change the price in the store's computer system, but such products have to be physically identified and manually re-labeled to indicate the discounted price. This is a time consuming process.

Furthermore, there may be other reasons than time for products to degrade in quality, such as e.g. being subjected to an increased temperature.

Hence, there is a need for a device which may be used to automatically indicate an expected quality of a product, and preferably also update an indicated price as a function of the expected quality.

EP 1 720 188 A1 discloses an electrochemical timer device having a source and a drain contact. The device further comprises a switch channel and a delay reservoir that are electrochemically interconnected with a gate electrode. The switch channel interconnects the source and drain contacts and is arranged to change electrical conductivity upon electrochemistry therein, and an electrochemical reaction is arranged to occur in the gate electrode and delay reservoir upon application of a drive voltage there between. The delay reservoir is arranged such that the electrochemical reaction occurring therein gradually moves towards the switch channel and eventually reaches the switch channel after a delay time thereby changing the electrical conductivity of the switch channel.

EP 1 862 786 A1 discloses a device, kit and method for monitoring a history of an external parameter, wherein a consumption process of one electrode is controllable by an amount of consumption of another electrode, and wherein the electrodes are in contact with different electrolytes, such that consumption rates of the electrodes present different dependencies on the external parameter.

While such a device can be used to deduce if and when a certain condition has occurred, and thus may be useful for many applications, it may be too complex for other applications. Furthermore, it requires some processing in order to convert the data contained in the device into information that can be readily understood by a user.

Hence, there is a need for a more simple device.

SUMMARY

It is a general objective of the present disclosure to provide a device which is able to change an indicated price of a product as a function of e.g. an expected degree of freshness of the product.

The invention is defined by the appended independent claims. Embodiments are set forth in the appended dependent claims and in the following description and drawings.

According to a first aspect there is provided a device for integrating and indicating a parameter over time, comprising, a first electrode, a second electrode, electrically isolated from the first electrode, an electrolyte, which is in contact with the first electrode and in consuming contact with a consumption portion of the second electrode, and at least two indicators, which are connected to the consumption portion at a respective connecting point, wherein the electrolyte and the consumption portion are selected such that when a voltage is applied over the electrodes, the consumption portion is consumed at a predetermined rate, wherein the indicators are arranged to switch states in response to a consumption frontier of the consumption portion reaching or-passing a respective connecting point associated with the indicator, wherein at least one of the indicators, possibly all of them, is a binary (on/off) indicator.

By "binary" is meant that the indicator is only capable of assuming two states, e.g. off and on, and that no further information is given by the indicator. However, this does not exclude that the indicator may be of such a nature as to present a delay, which causes it to shift gradually between the two states.

By "parameter" is meant any parameter substantially able to influence the consumption rate of the consumption portion, i.e. substantially influence the electrolyte. Non-limiting examples of such parameters may be temperature, moisture, a specific substance etc.

With such a device, it is possible to provide a simple and low cost device, which is capable of indicating that it has been stored for a certain time and/or at a certain condition derivable based on the parameter. As the time-parameter integral may be decisive for the expected quality of e.g. groceries, such a device may be useful as a quality indicator, and optionally to provide a dynamic price tag.

While such a function is applicable to groceries in particular, it may also find other types of applications, e.g. for pharmaceuticals, and other time/temperature sensitive products.

A property of the electrolyte may be dependent on the parameter. For example, the ion conductivity of the electrolyte may be dependent on the parameter. A parameter influencing the ion conductivity may be at least one of temperature, moisture and a predetermined substance.

A device as described above may be formed or arranged on a flexible substrate.

The consumption portion may comprise a conducting polymer, a conductivity of which is electrochemically modifiable. By electrochemically modifiable means that the conducting polymer may, for instance, be over-oxidized, which renders the conducting polymer to be less or substantially non-conducting.

The indicator may comprise a conducting polymer, which may form part of an electrochromic display.

The device may arranged so that a consumption front, upon activation of the device, is caused to move along the consumption portion, whereby a resistance between the second electrode and a respective connecting point is modified when the consumption front reaches or passes that connection point.

The indicator may comprise a first indicator portion which is user-recognizable, and/or a second indicator portion, which is machine-recognizable.

By "user-recognizable" is understood an indication that is readily understood by a user, such one or more letters, figures or symbols, or a combination thereof. By "machine-readable" is understood any pattern that is adapted for being read by a scanner device. As a non-limiting example, 1-, 2- or 3-dimensional barcodes may be used.

The first indicator portion may present at least one character or pointer.

A character may be any letter in any alphabetic system, and/or any figure or symbol. A pointer may be e.g. a bullet, frame, underlining, etc. indicating which one of a plurality of price or discount figures is currently applicable.

Hence the first indicator portion may display a discount percentage or a fixed price reduction when a certain time has elapsed or when the product has been exposed to a detrimental temperature for a prolonged period of time. This not only enhances the safety for the users but also allows for the shops and stores to sell products with a reduced residual shelf-life at a lower price, which may increase customer satisfaction.

The second indicator portion may form part of a standardized machine readable pattern.

Hence relating to the price tag example, the correct price may automatically be labeled on the article, and time consuming separate handling of goods at the cashier may be avoided and the risk of errors in payment price may be reduced.

The indicator may comprise a display device, having a first connection and a second connection. The first connection may be connected to the associated connecting point and, to a first potential, and the second connection may be connected to a second potential.

The device may be arranged such that the first potential is modified when the consumption front passes the associated connecting point.

The indicator may be arranged to switch states upon occurrence of a predetermined relationship between the first and second potentials.

The second potential may be substantially equal to a potential applied to the second electrode.

The indicators may be connected to the consumption portion (6) at respective connecting points which are spaced apart in a main movement direction of the consumption frontier.

Hence the predetermined rate at which the consumption portion is consumed may influence at what point in time the indicators are being switched.

According to a second aspect, there is provided a method for manufacturing a device as described above, the method comprising printing at least one of the electrode and the electrolyte on a substrate.

The printing may be achieved in a reel-to-reel process.

According to a third aspect, there is provided a product status indicating device, adapted for being attached to a product or package, comprising a device as described above.

In the product status indicating device, the indicator may be arranged to indicate a selling price or a discount as a function of time and temperature.

According to a fourth aspect, there is provided a time indicating device, comprising a power supply arrangement, arranged, upon activation, to provide a voltage, and at least two timer arrangements Each of the timer arrangements comprises a first electrode, a second electrode, an electrolyte, which is in contact with the first electrode and in consuming contact with a consumption portion of the second electrode, a binary (on/off) indicator, which is connected to the consumption portion at a connecting point. The electrolyte and the consumption portion are selected such that when the voltage is applied to the one of the electrodes, the consumption portion is consumed at a predetermined rate. The indicator is arranged to switch states in response to a consumption frontier of the consumption portion reaching or passing a connecting point associated with the indicator. The timer arrangements present different consumption portion lengths.

The power supply arrangement, once initiated, may be arranged to supply the voltage substantially continuously.

DESCRIPTION OF EMBODIMENTS

Figure 1:
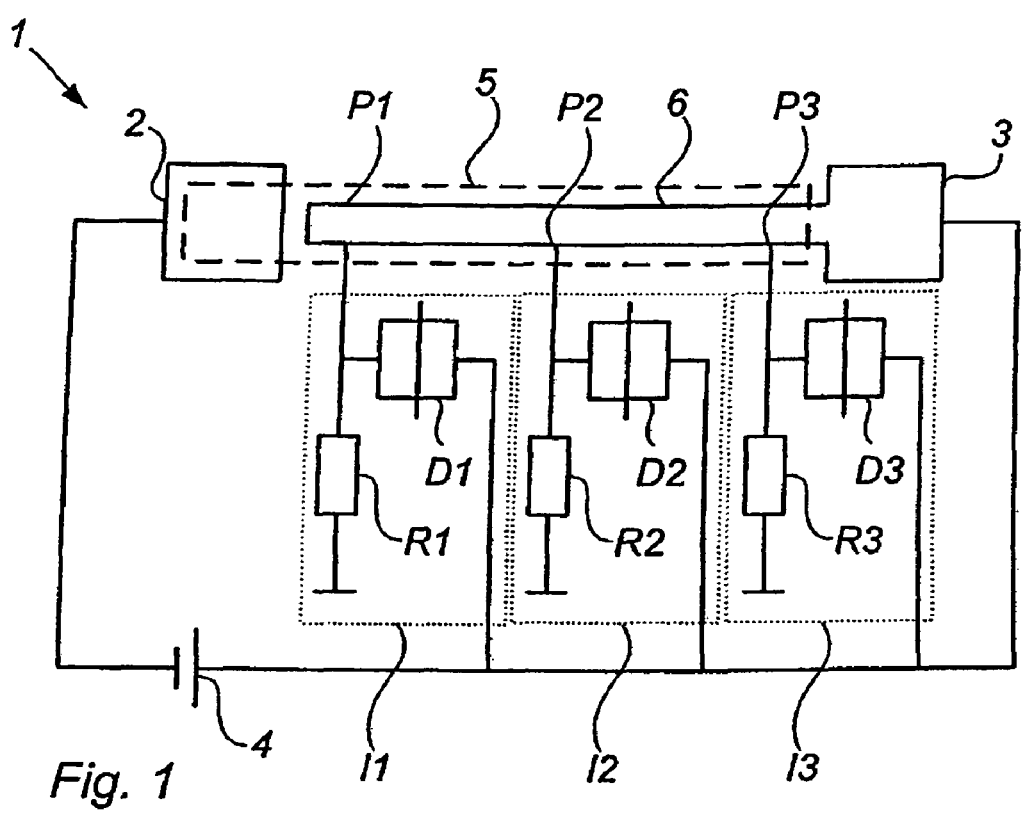
FIG. 1 is a schematic diagram of a time-parameter integrating and indicating device.

FIG. 1 illustrates a time-parameter integrating device I comprising a first electrode 2 and a second electrode 3. As a non-limiting example, a time-temperature integrating device will be discussed.

The device further comprises an electrolyte 5, arranged to be in contact with the first electrode and a portion 6 of the second electrode.

The device 1 may be arranged such that a potential may be applied over the first 2 and second 3 electrode.

The portion 6 may be arranged to be consumed, i.e. its conductive properties are altered, e.g. reduced, through an electrochemical reaction in a per se known manner. The electrolyte 5 and the consumption portion 6 may hence be selected such that they promote the consumption of the portion 6. The composition of the electrolyte 5 and material of the consumption portion 6 may further be selected such that the consumption portion may be consumed at a predetermined rate.

The composition of the electrolyte 5 may be selected such as to limit the flow of ions, i.e. the ionic conductivity, through the consumption portion 6. Examples of suitable electrolytes and electrode materials are described in e.g. WO02/071505A1 and in EP 1 862 786 A1.

The consumption portion 6 may comprise a conducting polymer material. A non-limiting example of such conducting polymer materials may be PEDOT:PSS. The consumption rate of the consumption portion 6 may, according to one embodiment, be determined by the amount of material used in the portion. The consumption rate of the consumption portion may, alternatively, be modified by altering the oxidation state of the material used in the consumption portion 6. The oxidation state of the material may be altered by bringing the consumption portion 6 into contact with e.g. an acid or a base. An acid may cause the consumption rate to increase and a base may cause the consumption rate to decrease.

A number of indicators I1, I2, I3 may be connected to the consumption portion 6 at an equal number of connecting points P1, P2, P3. The number of indicators arranged in contact with the consumption portion 6 may vary with the need and the application. The connecting points P1, P2, P3 may be spaced apart from each other at the consumption portion 6.

The indicator I1, I2, I3 may be a binary indicator, i.e. have an on and an off mode or state. The transition between the on and off state may be a substantially instantaneous reaction or alternatively may present a certain inertia, i.e. present a gradual shift between the on and off state.

The indicator I1, I2, I3 may comprise a conducting polymer which may form part of an electrochromic display. The conducting polymer may be the same or different as the conducting polymer in the consumption portion 6. The conducting polymer may be any conducting polymer suitable for the application, such as, but not limited thereto, PEDOT:PSS.

Each indicator may comprise a display device D1, D2, D3. The display device may at a first connection be connected to a first potential, which may be zero (i.e. ground), via a resistor R1, R2, R3, and to the connection point P1, P2, P3. Each display device D1, D2, D3 may further have a second connection, which may be connected to a potential, which is substantially equal to the potential applied to the second electrode 3.

Figure 2A:
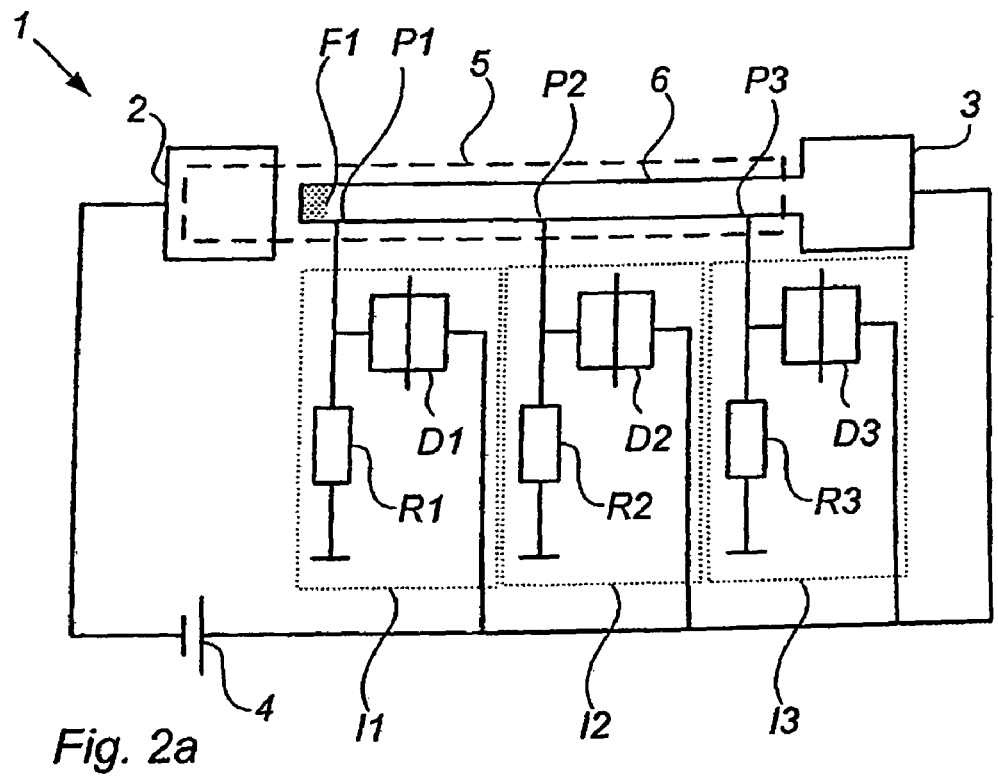
FIGS. 2a-2b illustrates the operating principle of the device of FIG. 1.
Figure 2B:
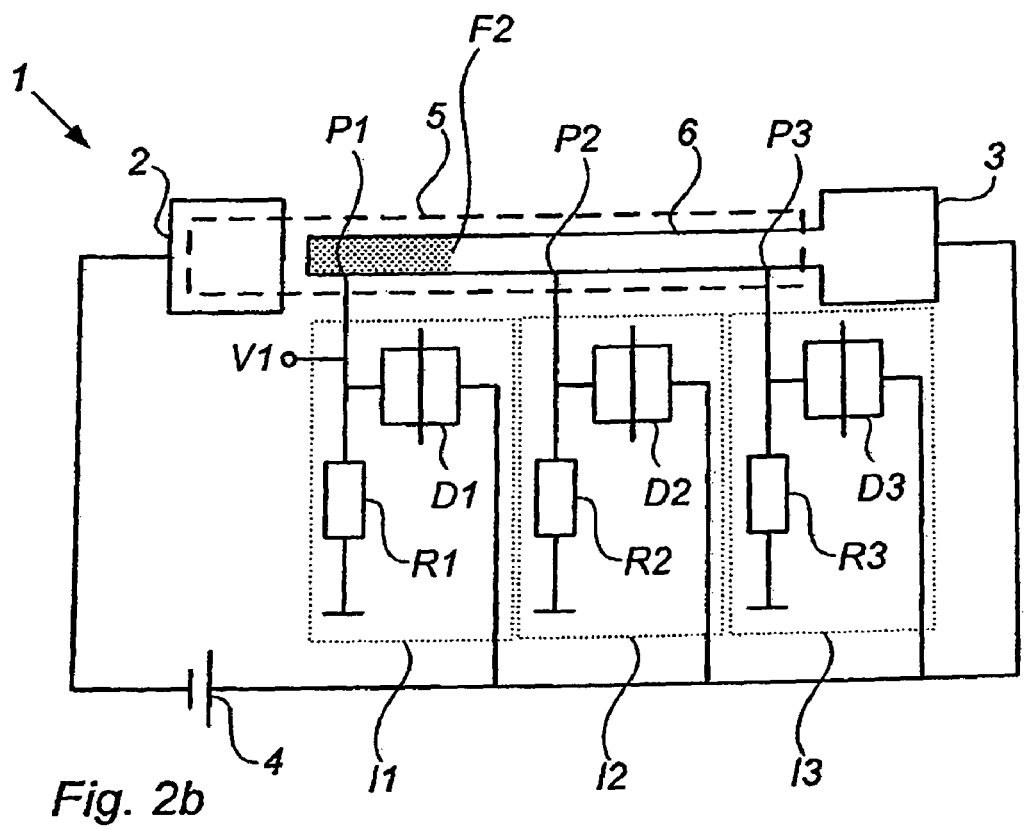

FIGS. 2a and 2b illustrates that the electrodes 2, 3 may be connected to a power source 4. The power source 4 may be, but is not limited to, a battery, e.g. an integrated battery, a voltage source etc. The integrated battery may be a printed battery of a non-chargeable type, e.g. Zn—Mn-oxide type, or of a (re-)chargeable type, e.g. based on a PEDOT:PSS system alone or PEDOT:PSS in combination with on electrode in another material.

The connection of the electrodes 2, 3 to the power source may create a potential difference over the electrodes, which may drive the electrochemical reaction in the device 1, i.e. typically an over-oxidization of the consumption portion 6. The voltage applied may, as a non-limiting example, be from about 4 V to about 10 V, or from about 5 V to about 8 V, or about 5 V.

The voltage applied may be adapted to the ion concentration of the electrolyte, such that a desired consumption rate may be achieved. Generally the higher voltage applied, the faster the ionic transport is carried out.

Figure 3:
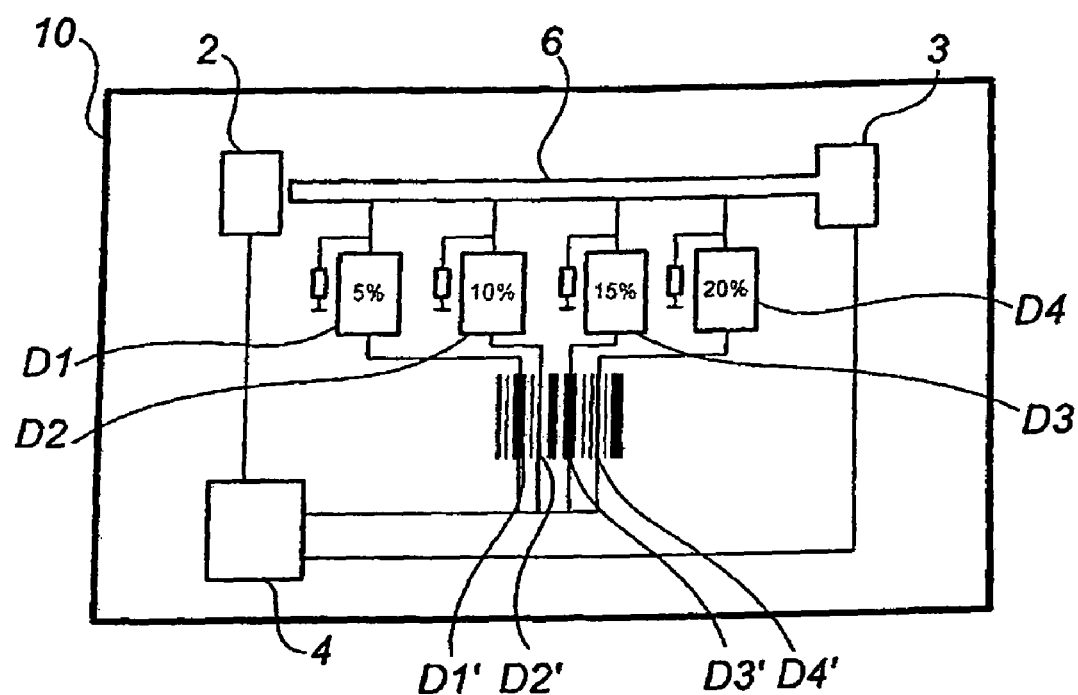
FIG. 3 schematically illustrates an intelligent label.

The voltage applied over the electrodes 2, 3 may drive the electro-chemical reaction that causes a consumption frontier F1, F2 to move along the consumption portion 6, from left to right in FIGS. 1-3. When the frontier F1, F2 passes a connecting point P1, P2, P3, the resistance between the second electrode 3 and the first connection of the display device D1, D2, D3 increases. The increase may be such as to substantially break the circuit. As the second connection of the display device D1, D2, D3 is still connected to the same potential as the second electrode 3, the current will instead go through the respective resistor R1, R2, R3 to ground. If the resistor has a resistance which is lower than that of the consumed part of the consumption portion 6, then a current will flow from the power source 4 through the display device to ground, thus activating the display device D1, D2, D3.

As the frontier continues to move along the consumption portion 6, the frontier F1, F2 may pass the second connecting point P2 and hence cause a change in the resistance of the circuit and hence a potential difference over the indicator I2, which may cause the indicator I2 to switch from an off state to an on state.

The change in resistance may be an increase in resistance. The increase in resistance may, according to one alternative, be from about 10 kΩ to about 10 MΩ. An increased resistance may correspond to an increased potential difference and a decrease in the voltage over the indicator. The decrease in voltage may be from about 5V to about 2V, depending on the initial voltage applied over the first 2 and second 3 electrode.

The indicator may, according to one embodiment, comprise a first D1, D2, D3, D4 and a second D1', D2', D3', D4' indicator portion (FIG. 3). The first indicator portion may be user-recognizable and the second indicator portion may be machine-recognizable.

The first display portion D1, D2, D3, D4 may be present at least one character or pointer. By a character is meant for instance a letter, a number or a symbol, or any combination thereof. The first portion may, as illustrated in FIG. 3, for instance display a percentage change in the prize of an article or a fixed prize reduction, based on the movement of the frontier F1, F2. A pointer may be e.g. a bullet, frame, underlining, etc., the pointer may for instance indicate which one of a plurality of price or discount figures that is currently applicable.

The second display portion D1', D2', D3', D4' may present a standardized machine readable pattern, for instance, but not limited thereto, 1-, 2-, 3-dimensional bar codes, such as EAN type codes and the like. The switch of the indicator from an off state to an on state may thus alter or recode the pattern or bar code, and hence the machine reading of the pattern.

The first and second display portions may be provided as parts of the same indicator, or as separate indicators.

In one embodiment there may be provided one set of indicators providing the user-recognizable indicator and another set of indicators providing the machine-readable indicator.

The indicator may, according to one embodiment, comprise only the first display portion or alternatively only the second display portion, hence, the indicator may be only user-recognizable or only machine-recognisable.

The device 1 as described above may, according to the embodiment schematically illustrated in FIG. 3, be comprised in a price tag 10 adapted for being attached to a product or package (not shown). The device may be arranged to be switched on directly when the label 10 is applied to the product, when the product leaves the manufacturer or when the product reaches the retailer. The device may further be arranged to provide a time-temperature integral as described above, such that the frontier F1, F2 moves in relation to time and a predetermined parameter, e.g. temperature.

The device may, alternatively, or as a complement, be arranged such as to be in contact with an atmosphere surrounding a product and hence be influenced by parameters selectable from this atmosphere, for instance the moisture content, soluble compounds, or the presence of acids or bases etc.

For example, the frontier may be arranged to move at a substantially fixed rate for any one parameter, such as temperature, with the rate being proportional to the parameter, e.g. temperature, to which the device is subjected.

If another parameter is chosen, e.g. moisture contents in the atmosphere surrounding the product, the device may also be used to display the status of a product or its package.

Thus, as illustrated in FIG. 3, the display may for instance display a discount or a fixed reduced price in a user-recognizable format and/or change the bar code such that both a cashier (or occasionally the customer himself) may easily detect the price change, and so that a scanner may detect the price change upon scanning the product.

The device may alternatively be used for monitoring different types of processes susceptible to parameters that are detectable by the device.

According to another aspect an indicating device 40 may be designed as schematically shown in FIGS. 4a-4c and FIG. 5.

According to this embodiment two time-parameter integrating devices 46, 47, as described above, or only time indicating devices be connected to one or more indicators 42, 43 respectively.

Figure 4A:
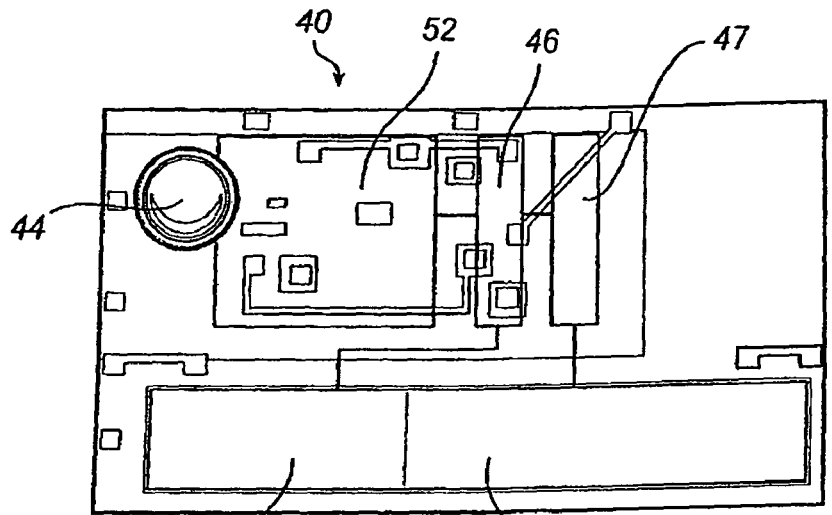
FIGS. 4a-4c are schematic illustrations of a time indicating device.

A push-button 44 may be provided, which when activated, i.e. switched to an on state, cause the display portions of the indicators 42, 43 to be activated. FIG. 4a illustrates that when the push-button has been activated the indicator 42, 43 may be initially un-activated.

Figure 4B:
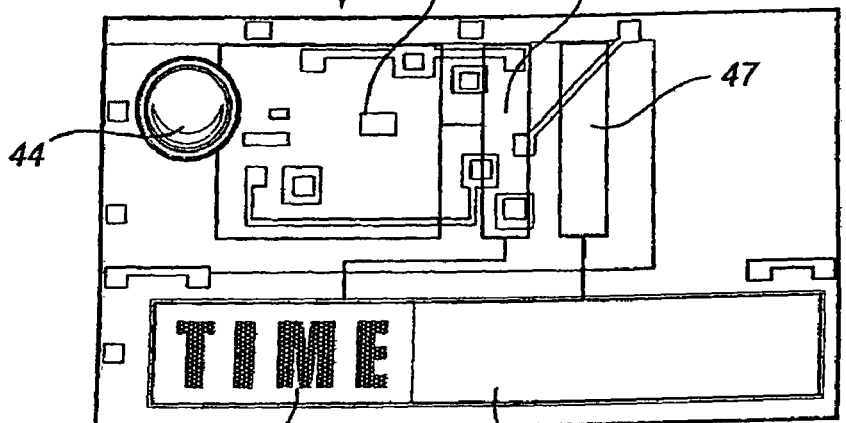
Figure 4C:
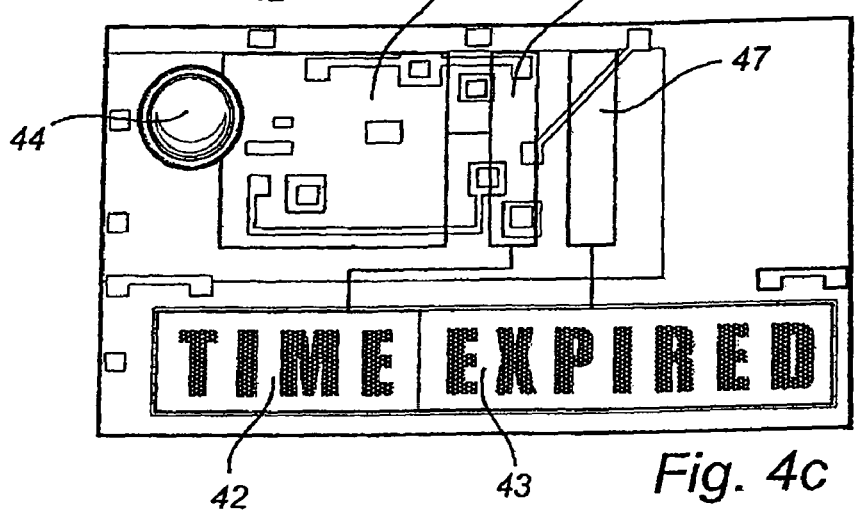

FIG. 4b illustrates that after a certain period of time one of the indicators 42 may be activated. FIG. 4c illustrates that when yet another period of time has passed, a second indicator 43 may be activated.

The consumption portions of the time-parameter integrating devices 46, 47 may have different predetermined consumption rates or different lengths, and hence the display portions of the indicators 42, 43 may be activated irrespective of each other, or after different periods of time have passed.

Using such a device, a compliance aid for persons taking medicines may be achieved. By this device 40 the push-button may be used to register when e.g. a pill is taken and the indicators 42, 43 may indicate when it is time to take the next pill, i.e. when the first indicator 42 is activated, and remind when that next pill should have been taken, i.e. when the second indicator 43 is activated.

Figure 5:
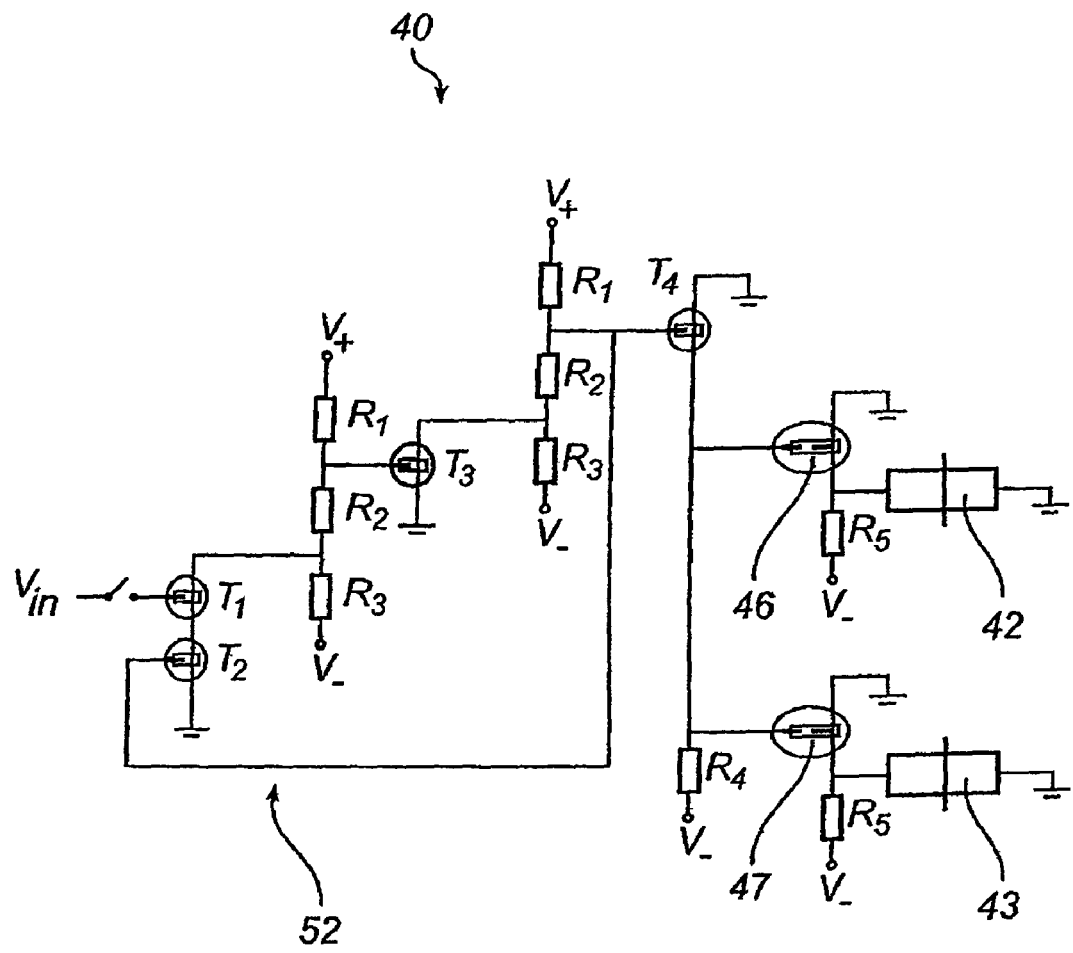
FIG. 5 is a schematic circuit diagram of the time indicating device of FIGS. 4a-4c.

The push-button 44 may be designed such as to be in an on state when it is pushed down, and the design and function of such a push-button is readily understood by a person skilled in the art based on FIG. 5.

A logic circuit 52, for the transduction of the on signal from the push-button 44 to the time-parameter integrating devices 46, 47 is schematically illustrated in FIG. 5. The logic circuit may be designed as an OR gate with feedback from its output. By using a feedback in the OR gate the output may stay high even though the in signal is switched from high to low. The top input of the gate represents the output from the push-button. With this design, the output is high if the push-button has been pushed down and low otherwise. The implementation of the OR gate was made by connecting a NOR gate and an inverter in series.

As shown in FIG. 5 the components to the left of $T_3$ is the NOR gate, $T_3$ and the resistors to the right is the inverter, V+ and V− represents +3 V and −3 V respectively.

The design and function of such a logic circuit 54 is readily understood by a person skilled in the art, and will not be further explained herein.

It is recognized that the products described herein may be formed on a flexible substrate. The electrodes, electrolytes and any covering or encapsulating materials may be deposited onto the substrate in a printing process, such as a reel-to-reel process. The substrate may be a paper or plastic film, which may be provided with an adhesive or other attachment means for attaching it toga product or package. In the alternative, the substrate may be the package or product itself.

Examples of materials that may be suitable for electrodes and electrolytes are available from the prior art documents cited above.

The invention claimed is:

1. A device for integrating and indicating a parameter over time, comprising:
    a first electrode,
    a second electrode, electrically isolated from the first electrode,
    an electrolyte, in contact with the first electrode and in consuming contact with a consumption portion of the second electrode,
    at least two indicators, connected to the consumption portion at a respective connecting point, wherein the electrolyte and the consumption portion are selected such that when a voltage is applied over the first and second electrodes, the consumption portion is consumed at a predetermined rate,
    wherein the at least two indicators are arranged to switch states in response to a consumption frontier of the consumption portion reaching or passing a connecting point associated with the respective indicator, and
    wherein at least one of the at least two indicators is a binary indicator.

2. The device as claimed in claim 1, wherein at least one of the at least two indicators comprises at least one of a first indicator portion which is user-recognizable, and a second indicator portion, which is machine-recognizable.

3. The device as claimed in claim 2, wherein a property of the electrolyte is dependent on the parameter.

4. The device as claimed in claim 1, wherein a property of the electrolyte is dependent on the parameter.

5. The device as claimed in claim 4, wherein the ion conductivity of the electrolyte is dependent on the parameter.

6. The device as claimed in claim 5, wherein the parameter is at least one of temperature, moisture and a predetermined substance.

7. The device as claimed in claim 4, wherein the parameter is at least one of temperature, moisture and a predetermined substance.

8. The device as claimed in claim 1, wherein at least one of the at least two indicators comprises a display device, having a first connection and a second connection, wherein the first connection is connected to the associated connecting point and, to a first potential, and wherein the second connection, is connected to a second potential.

9. The device as claimed in claim 8, wherein the device is arranged such that the first potential is modified when the consumption front passes the associated connecting point.

10. The device as claimed in claim 8, wherein at least one of the at least two indicators is arranged to switch states upon occurrence of a predetermined relationship between the first and second potentials.

11. The device as claimed in claim 8, wherein the second potential is substantially equal to a potential applied to the second electrode.

12. The device as claimed in claim 1, wherein the at least two indicators are connected to the consumption portion at respective connecting which are spaced apart in a main movement direction of the consumption frontier.

13. A method for manufacturing a device as claimed in claim 1, the method comprising:
    printing at least one of the first electrode, the second electrode and the electrolyte on a substrate.

14. The method as claimed in claim 13, wherein the printing is achieved in a reel-to-reel process.

15. A product status indicating device, adapted for being attached to a product or package, comprising a device as claimed in claim 1.

16. The product status indicating device, as claimed in claim 15, wherein at least one of the at least two indicators is arranged to indicate a selling price or a discount as a function of time and temperature.

17. A time indicating device, comprising a power supply arrangement, arranged, upon activation, to provide a voltage, and
at least two timer arrangements, each comprising:
a first electrode,
a second electrode,
an electrolyte, in contact with the first electrode and in consuming contact with a consumption portion of the second electrode, and
a binary indicator, connected to the consumption portion at a connecting point,
wherein the electrolyte and the consumption portion are selected such that when the voltage is applied to the first and second electrodes, the consumption portion is consumed at a predetermined rate,
wherein the indicator is arranged to switch states in response to a consumption frontier of the consumption portion reaching or passing a connecting point associated with the indicator, wherein the timer arrangements present different consumption portion lengths.

18. The device as claimed in claim 17, wherein the power supply arrangement, once initiated, is arranged to supply the voltage substantially continuously.

* * * * *